SIDESTEP OSCILLATION MEANS

Filed Dec. 30, 1955

2 Sheets-Sheet 1

INVENTOR.
PAUL G. WULFSBERG
BY Moody and Goldman
ATTORNEYS

INVENTOR.
PAUL G. WULFSBERG
BY Moody and Goldman
ATTORNEYS

United States Patent Office 2,840,714

Patented June 24, 1958

2,840,714

SIDESTEP OSCILLATION MEANS

Paul G. Wulfsberg, Cedar Rapids, Iowa, assignor to Collins Radio Company, Cedar Rapids, Iowa, a corporation of Iowa Application December 30, 1955, Serial No. 556,682

8 Claims. (Cl. 250—36)

This invention relates to sidestep oscillation means, which is used to provide simplex transmission and reception, wherein this invention eliminates the conventional sidestep oscillator, its mixer, and its crystal by a novel modification of the crystal selection system in a local oscillator of a simplex system.

Simplex transmission-reception equipment is commonly called a transceiver and provides sequential transmission and reception on a single carrier frequency, which may be transmitted either by radio waves or wire.

Simplex operation requires that the locally generated transmitting oscillation differs in frequency from the locally generated receiving oscillation used for heterodyning. The frequency difference is often called a "displacement" frequency or a "sidestep" frequency, and it is generally equal to the lowest intermediate-frequency of the receiving portion of the transceiver.

Where several intermediate-frequency stages are used, which is common practice, the displacement frequency is generally equal to the center frequency of last intermediate-frequency amplifier, which is used only for receiving. The last receiving intermediate-frequency stage, in plural intermediate-frequency transceivers, is usually fixed in frequency and is called herein the prime receiving intermediate-frequency stage.

Conventionally, a separate oscillator and a separate mixer are used to provide the displacement frequency, which is usually injected during transmission only. However, it can also be arranged to be injected during reception only, but in the latter case more spurious response is caused than in the former case, which usually makes injection during transmission preferable.

In addition to the sidestep oscillator, transceivers require at least one local oscillator to provide the primary frequencies of the system. In many transceivers, several crystal oscillators are used, in addition to the sidestep oscillator, to synthesize a large number of frequencies in a decade manner. The local oscillators other than the sidestep oscillator are called herein "prime local oscillators."

This invention modifies the crystal selection arrangement for one of the prime local oscillators in a transceiver in a manner which attains the required displacement frequency without the need for the conventional sidestep oscillator, its crystal, or its mixer. Thus, the invention eliminates the sidestep oscillator, its crystal, and its mixer from a transceiver with a corresponding reduction in the number of required components and a reduction in equipment size and arrangement.

Thus, in simplex equipment which has several banks of crystals utilized in a crystal-saving scheme, this invention may be provided with any of the crystal banks. The chosen crystal bank will generally be one having a required frequency interval among its consecutive crystals. The invention uses the single set of crystals for a dual function that provides the displacement frequency and the prime frequencies of the system without the need of any additional crystals, oscillators or mixers.

The invention can utilize any bank of two or more crystals wherein the displacement frequency has an integer multiple relationship to the frequency interval between consecutive crystals. There is no theoretical upper limit to the number of crystals that may be used in a chosen bank of crystals other than a number designated by practical requirements.

The invention features a switching arrangement among a bank of prime oscillator crystals, and permits efficient use of every crystal in the bank; whereby two different crystals are used at each different carrier frequency. The frequency difference between any two selected crystals used at a given carrier frequency falls within the bandpass of the prime receiving intermediate-frequency stage, and comprises the displacement frequency of the system.

During reception, the local heterodyning frequency provided by the invention will at times be injected above the incoming frequency, and at other times will be injected below the incoming frequency. In each case, the injected frequency will differ from the incoming frequency by an amount which falls into the bandpass of the following prime intermediate-frequency amplifier.

Double-layer wafer type switches, having a single-pole rotor contact on each side, wherein opposite rotor contacts are insulated from each other, are particularly well suited for the switching operation of this invention. A plurality of stator contacts are provided on each side of the wafer, and the stator contacts that are adjacent on opposite sides of the wafer are connected to each other to form integral pairs, which are connected respectively in consecutive order to the crystals.

The invention is capable of providing several types of switching arrangements. However, the optimum switching arrangement of this invention will satisfy the following formula:

$$(F_d)_{\text{max.}} = \frac{N_c F_i}{2} \qquad (1)$$

where $(F_d)_{\text{max.}}$ is the maximum displacement frequency of a given bank of crystals, $F_i$ is the frequency interval between consecutive crystals in the bank, and $N_c$ is the number of crystals in the bank.

In the optimum case, a wafer-type switch can have a minimum number of stator contacts and can provide the simplest switching arrangement. Here, the wafer switch may have, on each side of the stator, contacts equal in number to the crystals in the bank and substantially equally-spaced around the stator periphery. As stated above, adjacent stator contacts on opposite sides of the wafer are connected together in pairs and are connected respectively to the consecutive crystals in the bank. The poles on opposite sides of the wafer are positioned 180 degrees from each other and are insulated from each other. The transmitted frequency, or a synthesis component, is obtained by connecting the prime oscillator to one rotor contact; and the heterodyning frequency, or a synthesis component, is obtained by connecting the prime oscillator to the opposite rotor.

In a situation where a displacement frequency less than $(F_d)_{\text{max.}}$ is required, the invention can still be constructed using a tap-switch arrangement, but is somewhat more complex. Here, the wafer switch requires more stator contacts, and also requires connections between particular contacts. In the general case, the number of stator contacts may be defined by the following formula:

$$N_t = N_c + \frac{F_d}{F_i} \qquad (2)$$

Where $N_t$ is the minimum number of equally-spaced stator contacts, $N_c$ is the number of crystals in the chosen bank, $F_d$ is the displacement frequency, and $F_i$ is the frequency interval between crystals in the bank. This formula does not hold when a maximum displacement frequency is used, in which case $N_t$ equals $N_c$.

As in the optimum case, adjacent pairs of stator contacts on opposite sides of the wafer are connected respectively to the crystals in the bank, leaving an excess of stator contacts, being $F_d/F_i$ in number. These contacts are connected respectively to crystals providing the required frequency difference, which can easily be determined in a particular case using the principles taught by this invention.

Of course, the stator and rotor arrangements of the invention may be reversed for the same result.

Further objects, features and advantages of this invention will be apparent to a person skilled in the art after study of this specification and drawings, in which.

Figure 1:
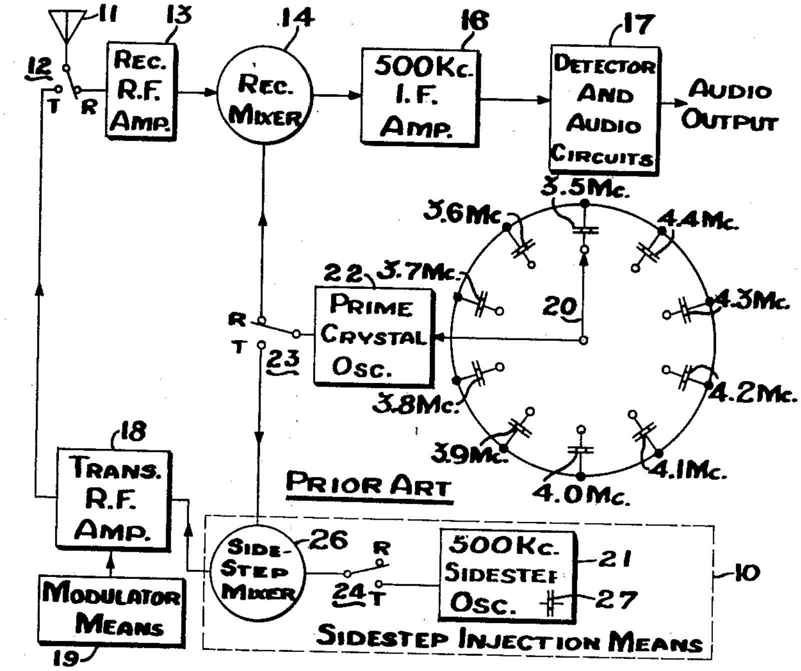
Figure 1 is a schematic diagram illustrating a crystal frequency system using a conventional sidestep oscillator, that injects only during transmission.
Figure 2:
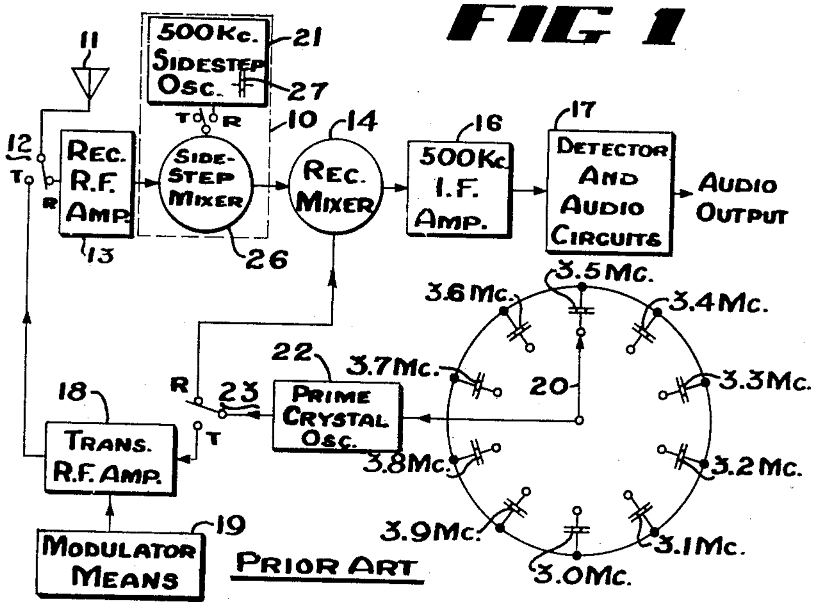
Figure 2 is a schematic diagram of a crystal frequency scheme using a conventional sidestep oscillator, which injects only during reception.

In order to understand this invention, it is necessary to understand the operation of conventional transceiver crystal frequency schemes utilizing sidestep oscillators. Figures 1 and 2 are shown for this purpose, and they differ in regard to the manner of connection of a sidestep oscillator into the transceiver system. Many different varieties of connections of sidestep oscillators into transceiver systems are known, and the systems of Figures 1 and 2 are only illustrative of the prior art.

Figure 1 illustrates a simplified schematic of a transceiver having a sidestep injection means 10 that injects during transmission only. This is perhaps the most prevalent manner of using sidestep oscillators; although, of course, the over-all frequency scheme, including the number of radio-frequencies and intermediate-frequency stages, may differ and will often be more complex. Figure 1 shows an antenna 11 used for transmitting and receiving, and it is connected to the pole of a switch 12 which has one contact R engaged during receiving and another contact T engaged during transmitting.

The receiving channel of the transceiver includes a receiving radio-frequency amplifier 13, a receiver mixer 14, an intermediate-frequency amplifier 16, and various detector and audio circuits 17. The receiver radio-frequency amplifier 13 has its input connected to antenna switch contact 12R. One input to receiver mixer 14 is connected to the output of radio-frequency amplifier 13; and intermediate-frequency amplifier 16 is connected to the output of mixer 14. Block representation 17 of the detector and audio circuits receives the output of intermediate-frequency amplifier 16 and provides the modulation output, which may be an audio output or any other type of modulation information.

The transmitter channel in Figure 1 includes a transmitter radio-frequency amplifier 18, and a modulator means 19 for modulating the transmitted carrier frequency.

The transceiver of Figure 1 includes two oscillators, which are a prime oscillator 22 and a sidestep oscillator 21. The prime oscillator 22 utilizes a bank of crystals, which in Figure 1 has ten crystals which vary in frequency from 3.5 megacycles to 4.4 megacycles with 0.1 megacycle intervals between consecutive crystals. The terms, megacycles and kilocycles, are conveniently used herein to represent megacycles-per-second and kilocycles-per-second, respectively. Any of the ten crystals may be connected at one instant by the pole 20 of a wafer type switch that has ten stator contacts connected respectively to the consecutive crystals.

A single-pole double-throw switch 23 has its pole connected to the output of prime crystal oscillator 22. One contact 23R is engaged during reception and is connected to the other input of receiver mixer 14; and the other contact 23T is engaged during transmission.

Sidestep injection means 10 comprises sidestep oscillator 21, a switch 24, and a sidestep mixer 26. Sidestep oscillator 21 is controlled by a crystal 27 and provides an output frequency equal to the tuned frequency of receiver I. F. amplifier 16 which, for example, is 500 kilocycles in Figure 1. Single-pole single-throw switch 24 is serially connected between the output of sidestep oscillator 21 and one input to sidestep mixer 26. Switch 24 is closed during transmission and open during reception. The other input to sidestep mixer 26 is connected to transmit contact T of switch 23.

Sidestep mixer 26 mixes the prime frequency from oscillator 22 with the sidestep frequency from oscillator 21; and their difference frequency is selected by transmitter radio-frequency amplifier 18 to provide the transmitted carrier frequency.

The switches 12, 23, and 24 might be part of a relay, which is operated by a push-to-talk button of the transceiver. The output of the transceiver in Figure 1 utilizes ten carrier frequencies, which range from 3.0 to 3.9 megacycles in 0.1 megacycle intervals.

The conventional system of Figure 2 illustrates the sidestep injection means 10 connected to the receiving channel rather than the transmitting channel of the transceiver. Accordingly, the same reference numerals are used for like components. Here sidestep mixer 26 has one input connected to the output of receiver radio-frequency amplifier 13. The output of sidestep mixer 26 is provided to one input of receiver mixer 14, which has its other input connectable to prime oscillator 22, as was done in Figure 1. It will be noted that an additional filter will probably be required in a pratcical case between sidestep mixer 21 and receiver mixer 14, due to the large spurious response that will occur in having mixers connected as shown in Figure 2, this situation generally makes the arrangement of Figure 1 preferable, in conventional systems.

The system of Figure 2, like the system shown in Figure 1, utilizes ten carrier frequencies, which have the same range from 3.0 to 3.9 megacycles in 0.1 megacycle increments.

It will be noted, in each of Figures 1 and 2, that eleven crystals, two oscillators, and two mixers are required to provide a range of ten transceiver carrier frequencies, wherein operation on any of the ten carrier frequencies is obtained by positioning pole 20 of the wafer switch to connect any of the ten crystals in the crystal bank to prime crystal oscillator 22.

Figure 3:
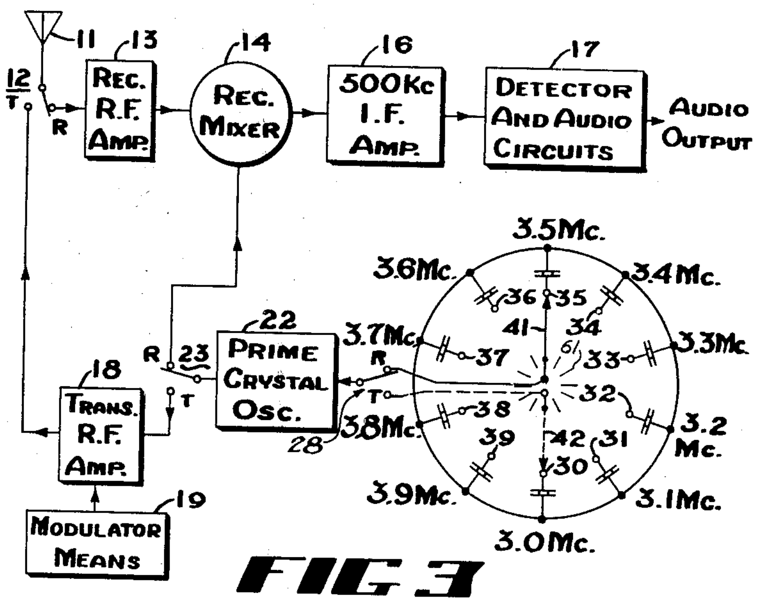
Figure 3 is a schematic diagram of a crystal frequency scheme utilizing an optimum form of the invention.

Figure 3 illustrates in a simplified manner, a transceiver system embodying an optimum form of the invention, which complies with Formula 1 above. The components in Figure 3 that are common to Figure 1 are given the same reference numerals.

The transceiver system of Figure 3 provides the same carrier frequencies as do the systems in Figures 1 and 2, which are 3.0 through 3.9 megacycles, so that the invention may be compared to conventional systems that most nearly provide the same output-input performance.

In Figure 3, receiver radio-frequency amplifier 13 has its input connected to receive contact R of antenna switch 12; and one input to receiver mixer 14 is connected to the output of receiver amplifier 13. Intermediate-frequency amplifier 16 has its input connected to the output of receiver mixer 14; and the input to block representation 17, which comprises the detector and audio circuits, receives the output of intermediate-frequency amplifier 16.

Transmitter radio-frequency amplifier 18 has its output connected to transmit contact T of switch 12, and output of modulator means 19 is connected to radio-frequency amplifier 18 to modulate the carrier frequency.

The prime crystal oscillator 22 is connected, on the one hand, through transmit contact T of switch 23 to the input of transmitting radio-frequency amplifier 18 and is connected, on the other hand, through receive contact 23R to the remaining input to receiver mixer 14.

The unique structural feature of Figure 3 is the particular switching arrangement provided for a bank of prime oscillator crystals and their particular type of cooperation with the transceiver system, which results in a unique reduction in transceiver components and improved performance of the whole system, which will be explained below.

In Figure 3, ten crystals of frequencies 3.0 megacycles through 3.9 megacycles are respectively connected to ten equally spaced contacts 30 through 39, about the stator of a wafer switch. The contacts 30 through 39 are actually pairs of contacts that are on both sides of the wafer switch stator; and they are engaged on one side of the wafer switch by a pole 41, and they are engaged on the other side of the wafer switch by another pole 42. The poles 41 and 42 are insulatingly supported on opposite sides of the rotor portion 61 of the wafer switch, and are located 180 degrees in position from each other.

A single-pole double-throw transmit-receive switch 28 has its pole connected to the input of prime crystal oscillator 22. The receive contact 28R connects to one pole 41 of the wafer switch, and the transmit contact 28T connects to the other pole 42 of the wafer switch.

The transceiver of Figure 3 can be made to operate on any one of the ten carrier frequencies 3.0 to 3.9 megacycles by rotating the rotor of the wafer switch to any of its ten rotational positions; wherein pole 42 connects the crystal providing the desired carrier frequency, and the opposite pole 41 connects the crystal that is 500 kilocycles removed in frequency.

For example, when switches 12, 23 and 28 engage their transmit contacts T, and poles 41 and 42 engage contacts 35 and 30, respectively, a carrier frequency of 3.0 megacycles is transmitted. And when a carrier frequency of 3.0 megacycles is received by antenna 11, and the switches are actuated to receive position R, prime crystal oscillator 22 provides a 3.5 megacycle output frequency, that heterodynes in receiver mixer 14 to obtain a 500 kilocycle difference frequency, which is accepted by 500 kilocycle I. F. amplifier 16 to ultimately provide the audio output. In this example, prime crystal oscillator 22 injects its heterodyning frequency above the carrier frequency received by mixer 14.

In another example, wafer-switch pole 42 connects the 3.9 megacycle crystal to provide a carrier frequency of 3.9 megacycles during transmit conditions. On the other hand, when a 3.9 megacycle carrier frequency is received, oscillator 22 provides 3.4 megacycle frequency which is received, heterodyned in receiver mixer 14 against the 3.9 megacycle incoming carrier to provide an output difference frequency of 500 kilocycles, which is received by intermediate-frequency amplifier 16. In this example, prime crystal oscillator 22 injects its heterodyning frequency below the carrier-frequency received by mixer 14.

The complete relationship in Figure 3 among the ten carrier frequencies and the selected transmit and received crystals is indicated by the following chart:

*Table I*

| Carrier Frequency, mc./sec. | Trans. Crystal, mc./sec. | Rec. Crystal, mc./sec. |
|---|---|---|
| 3.0 | 3.0 | 3.5 |
| 3.1 | 3.1 | 3.6 |
| 3.2 | 3.2 | 3.7 |
| 3.3 | 3.3 | 3.8 |
| 3.4 | 3.4 | 3.9 |
| 3.5 | 3.5 | 3.0 |
| 3.6 | 3.6 | 3.1 |
| 3.7 | 3.7 | 3.2 |
| 3.8 | 3.8 | 3.3 |
| 3.9 | 3.9 | 3.4 |

By way of contrast, and in order to illustrate the unusual results provided by this invention, the components of Figure 3 may be compared to the components of the systems of Figures 1 or 2, since each system provides a transceiver that operates with the same ten carrier frequencies. Thus, it is noted that the system of Figure 3 has: ten crystals rather than eleven, one oscillator rather than two, and one mixer rather than two.

Consequently, the structural switching change of Figure 3, which is very economical to provide, eliminates from the conventional system, one crystal, one oscillator, and one mixer. Thus, at least one crystal, two electron tubes, and their associated circuitry, including resistors, capacitors and inductors, are eliminated. Furthermore, the over-all electrical performance of the system of Figure 3 is better than that of either Figure 1 or Figure 2, because the invention has one less mixer to generate spurious frequencies, which means that the invention can provide less difficulty with spurious response than conventional systems.

Figure 4:
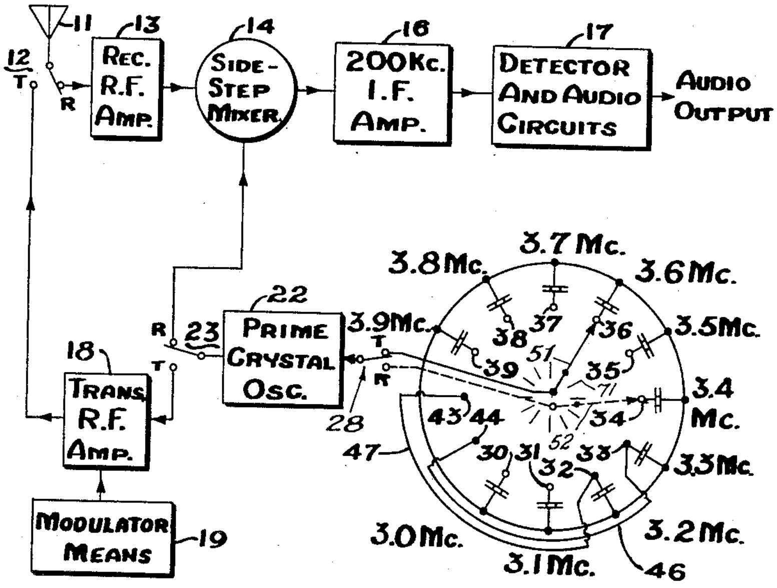
Figure 4 illustrates another schematic diagram which illustrates another form of the invention.

Figure 4 shows another form of the invention which uses a displacement frequency that is less than the optimum displacement frequency defined by Formula 1 above. This situation requires more stator contacts on the wafer switch than is required in the optimum situation but also eliminates the conventional sidestep injection means. The minimum number of stator contacts in the embodiment of Figure 4 is defined by Formula 2 above.

The items in Figure 4, which are similar to items in Figure 3, are given the same reference numerals; and the same crystals are used. However, a 200 kilocycle displacement frequency is used in Figure 4 instead of the 500 kilocycle displacement frequency in Figure 3.

When the displacement frequency is 200 kilocycles, Formula 2 teaches that a minimum of twelve contacts must be used on the wafer switch of Figure 4 with the given bank of ten crystals. Of course, a wafer switch having more than twelve contacts could be used, but the extra contacts may be dormant. Thus, the wafer switch in Figure 4 has twelve contacts 30 through 39, 43 and 44; wherein ten of them, which are contacts 30 through 39, connect respectively to the 3.0 megacycle through 3.9 megacycle crystals. A conductor 46 connects the eleventh contact 44 to the 3.3 megacycle crystal; and another conductor 47 connects the twelfth contact 43 to the 3.2 megacycle crystal.

The wafer switch in Figure 4 has poles 51 and 52 on opposite sides of its rotor 71, which are insulatingly situated and connected to the transmit-receive switch 28 in the same manner as the poles 41 and 42 in the wafer switch of Figure 3. However, in Figure 4, the angular spacing between poles 51 and 52 is 60 degrees so that they engage crystals having a 200 kilocycle frequency difference as the wafer switch rotor is rotated through ten positions, in which pole 51 engages any one of the ten contacts 30 through 39, that connect directly to the crystals. Generally, it will not be desired to have pole 51 engage the indirectly connected contacts 43 and 44 because of transceiver calibration ambiguities and the incorrect displacement frequency which may occur in these positions. However, a transceiver tuning knob arrangement may be provided with rotational limits that prevent engagement of pole 51 with contacts 43 and 44. This can easily be done.

The following table indicates the relationship between the transceiver carrier frequencies in Figure 4 and the crystals selected at the various carrier frequency positions to provide the 200 kilocycle displacement frequency:

*Table II*

| Carrier Frequency, mc. | Trans. Crystal, mc. | Receiver Crystal, mc. |
|---|---|---|
| 3.0 | 3.0 | 3.2 |
| 3.1 | 3.1 | 3.3 |
| 3.2 | 3.2 | 3.0 |
| 3.3 | 3.3 | 3.1 |
| 3.4 | 3.4 | 3.2 |
| 3.5 | 3.5 | 3.3 |
| 3.6 | 3.6 | 3.4 |
| 3.7 | 3.7 | 3.5 |
| 3.8 | 3.8 | 3.6 |
| 3.9 | 3.9 | 3.7 |

In Figure 4, the connection of rotor poles 51 and 52 to the T and R contacts of switch 28 may be reversed, which will reverse the order of the high and low injection of the heterodyning frequency into receiver mixer 14.

Nevertheless, the displacement frequency in an arrangement like that shown in Figure 4 might be an integer multiple of the frequency interval, $F_i$, up to and including the optimum displacement frequency. If the displacement frequency exceeds the optimum value, additional crystals are required in the crystal bank. The number of additional crystals may be calculated as as follows: An additional crystal must be added to the bank for each interval, $F_i$, that the given displacement frequency exceeds the optimum displacement frequency determined by Formula 1 above. Although the number of crystals is increased by this arrangement, it still eliminates the sidestep oscillator and the sidestep mixer.

Generically, it is the interval the between utilized consecutive crystals that is important in determining the displacement frequency of a transceiver; and, accordingly, it is not important what the absolute frequencies of the crystals are. This is apparent from Formula 1 which defines the maximum displacement frequency only in terms of the frequency interval, $F_i$, and the total number of crystals $N_t$. Thus, if the crystal having the lowest frequency provides a frequency $F_l$, the frequencies of the other crystals in the bank may be stated consecutively by a mathematical series, which is $F_l+F_i$ for the second crystal, $F_l+2F_i$ for the third crystal, $F_l+3F_i$ for the fourth crystal . . . , and $F_l+(N_t-1)F_i$ for the last crystal.

It may be stated that a particular crystal need not have exactly the frequency which is defined by this series, and in fact, may vary from the defined frequency by any amount as long as it provides a displacement frequency that is within the bandpass of the following intermediate-frequency amplifier.

Various other types of switching devices may be used to obtain the switching arrangement required by the invention instead of the wafer type switch explained herein. For example, a cam arrangement actuating single-pole double-throw switches could be used, or two switches of almost any type, wherein each has a single-pole and $N_t$ number of contacts, could be used by having their poles mechanically interlocked.

Also, it is realized that fixed tuned resonant circuits may be substituted for the crystals in the above described system.

It is, therefore, apparent that this invention simplifies the construction of simplex electronic equipment by enabling a substantial reduction in its size, weight, and number of components. The invention in no way deteriorates the performance of a transceiver, but as a matter of fact, improves its performance by obtaining less spurious response than transceivers using the conventional sidestep oscillator system.

While particular forms of the invention have been described in the specification, it will be obvious to a person skilled in this art that the invention is capable of many modifications. Changes, therefore, in the construction and arrangement of the invention may be made without departing from the scope of the invention as given by the appended claims.

I claim:

1. Sidestep oscillation means for a transceiver having at least one crystal oscillator utilizing a bank of crystals, comprising a double-layer wafer switch having stator contacts that are equally spaced and equal in number to the crystals in said bank, adjacent contacts located on opposite sides of said wafer switch connected in pairs, a single-pole rotor provided on each side of said wafer switch, said rotors being insulated from each other and having their poles situated approximately 180 degrees from each other, said crystals connected consecutively in the order of their frequency to said stator contacts, and means for connecting one of said poles to said oscillator for transceiver receiving and for connecting the other of said poles to said oscillator for transceiver transmitting, whereby the number of prime frequencies and the number of displacement frequencies provided from said oscillator each equal the number of crystals in said bank.

2. Sidestep oscillator means for a transceiver having at least one prime crystal oscillator utilizing a bank of crystals with approximately equal frequency intervals between adjacent crystals, comprising a double-layer tap switch having a pair of opposite single-pole rotors insulated from each other and with their poles situated angularly opposite from each other, said switch having a plurality of equally-spaced stator contacts equal in number to the crystals of said bank and engageable by both of said rotors, the crystals in said bank consecutively connected in the order of their frequency to said stator contacts, a single-pole double-throw switch having its pole connected to said prime crystal oscillator, with one contact connected to one of said rotors, and with the other contact connected to the other of said rotors, whereby the oscillator output can provide a prime-frequency and a sidestep frequency for every crystal in its bank with the sidestep frequency equal approximately to one-half of the product of the frequency interval times the number of crystals in the bank.

3. Sidestep oscillator means for a transceiver having at least one crystal oscillator that utilizes a bank of crystals and has a sidestep frequency equal to one-half of the product of the number of crystals in the bank by the frequency interval between consecutive crystals in the bank, comprising a pair of rotary switches, a shaft of insulating material fixed to the rotors of said switches, with said rotors each having a single-pole wherein said poles are fixed insulatingly on said shaft approximately 180 degrees with respect to each other, each of said rotary switches having equally spaced stator contacts equal in number to the crystals in said bank, said crystals consecutively connected in the order of their frequency to the stator contacts of each switch, a single-pole double-throw switch with its pole connected to said oscillator, with one switch contact slideably connected to one of said rotors and the other switch contact slideably connected to the other of said rotors.

4. Sidestep oscillation means for a transceiver having at least one prime crystal oscillator utilizing a bank of crystals, comprising a pair of rotary-wafer switches each having a single-pole rotor, a shaft insulatingly connected to the rotors of the wafer switches, each of said switches having substantially equal spaced stator contacts equal in number to said crystals, said crystals connected in consecutive order of frequency to the stator contacts of said first switch, and said crystals also connected in consecutive order of frequency to the stator contacts of said second switch, the poles of said switches connecting at any instant a pair of crystals having a frequency difference approximately equal to one-half of the product of the number of crystals by the frequency interval between consecutive crystals in the bank, whereby said frequency difference provides the sidestep frequency for said transceiver by alternately connecting said rotors to said prime crystal oscillator.

5. Sidestep oscillation means for a transceiver having at least one prime crystal oscillator utilizing a bank of crystals, wherein said sidestep frequency is an integer multiple of the frequency interval between adjacent crystals, comprising a double-layer wafer switch having single-pole rotors on opposite sides insulated from each other, said stator having a plurality of equally-spaced stator contacts equal in number at least to the number of crystals in said bank plus the ratio of the required sidestep frequency of said transceiver divided by said frequency interval, said crystals consecutively connected in the order of their frequency to said stator contacts, leaving an excess of stator contacts, said rotor poles displaced angularly with respect to each other by the number of said intervals that provides said sidestep frequency, said excess stator contacts each connected to a stator contact spaced therefrom by twice the number of intervals as is required between said crystals to provide said displacement frequency, and means for connecting one of said poles to said prime crystal oscillator while said transceiver is transmitting and for connecting the other of said poles to said oscillator while said transceiver is receiving.

6. Sidestep oscillation means for a transceiver having at least one prime crystal oscillator utilizing a bank of crystals, wherein said sidestep frequency is approximately an integer multiple of the frequency interval between adjacent crystals, comprising a double-layer wafer switch having insulated single-pole rotors on each side, and a plurality of equally-spaced stator contacts, adjacent stator contacts on opposite sides of said switch connected together in pairs, said crystals consecutively connected in frequency order to said stator contacts, said stator having at least $F_d/F_i$ number of excess stator contacts, where $F_d$ is the displacement frequency, and $F_i$ is the frequency interval between consecutive adjacent crystals, said poles fixed angularly with respect to each other to subtend $F_d/F_i$ angular intervals, said excess contacts respectively connected to other stator contacts to subtend $2F_d/F_i$ angular intervals between these connected contacts, and a single-pole double-throw switch having its pole connected to said oscillator, with one contact slideably connected to one of said wafer-switch rotors and the other contact slideably connected to the other of said wafer-switch rotors.

7. Sidestep oscillation means for a transceiver having at least one prime crystal oscillator utilizing $N_c$ number of consecutive crystals having substantially equal frequency intervals $F_i$, wherein said transceiver has a displacement frequency $F_d$ which is an integer multiple of the frequency interval $F_i$, comprising a pair of tap switches each having a single-pole rotor, and a stator having at least $N_c+F_d/F_i$ number of equally-spaced stator contacts, said crystals consecutively connected to $N_c$ number of contacts on each side of said switch, a shaft insulatingly connecting said rotors with an angular displacement that subtends $F_d/F_i$ number of frequency intervals between crystals connected at one time, each of the excess contacts respectively connected to one of said $N_c$ number of stator contacts and angularly displaced by $2F_d/F_i$ frequency intervals, and means for connecting one of said rotors to said oscillator for transceiver transmission and for connecting the other of said rotors to said oscillator for transceiver reception, whereby said oscillator can provide a prime frequency and a sidestep frequency for every one of its connectable crystals.

8. Sidestep oscillation means for simplex transmitter-receiver equipment having at least one crystal oscillator utilizing a bank of crystals, wherein the sidestep frequency $F_d$ is approximately an integer multiple of the frequency interval $F_i$ between adjacent crystals, comprising a pair of tap switches, each having a single-pole rotor, each of said tap switches having a plurality of stator contacts at least equal in number to the number of crystals plus the number $F_d/F_i$, said crystals consecutively connected to $N_c$ number of stator contacts on each tap switch, a shaft coupling said tap-switch rotors, wherein at each shaft setting said rotors engage crystals having a frequency difference equal approximately to said sidestep frequency, and means for connecting one of said rotors to said oscillator for equipment transmission and for connecting the other of said rotors to said oscillator for equipment reception, the excess number of contacts on each tap switch being connected to the crystals that differ in frequency from the oppositely connectable crystal by the required sidestep frequency.

References Cited in the file of this patent

UNITED STATES PATENTS

| | | |
|---|---|---|
| 1,639,817 | Taylor | Aug. 23, 1927 |
| 2,157,576 | Schneider | May 9, 1939 |
| 2,419,593 | Robinson | Apr. 29, 1947 |
| 2,529,550 | Harris | Nov. 14, 1950 |

FOREIGN PATENTS

| | | |
|---|---|---|
| 279,488 | Switzerland | Nov. 30, 1951 |